May 10, 1966 R. B. WAGNER 3,250,833
PROCESS OF MAKING AN IMPREGNATED CERAMIC
Filed May 29, 1959
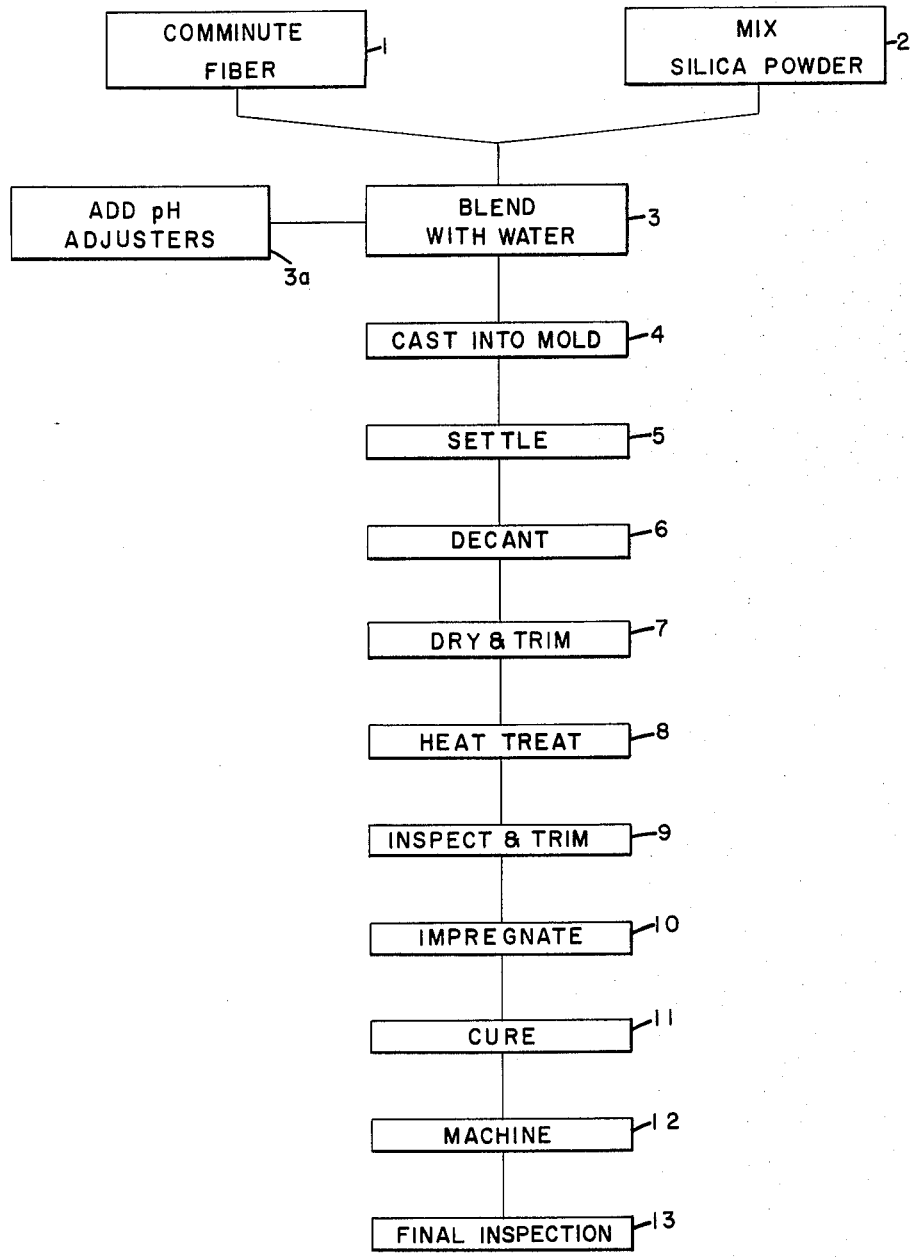
RICHARD B. WAGNER
INVENTOR.
BY
ATTORNEYS

United States Patent Office 3,250,833
Patented May 10, 1966

3,250,833
PROCESS OF MAKING AN IMPREGNATED
CERAMIC
Richard B. Wagner, North Woburn, Mass., assignor to
Avco Corporation, Cincinnati, Ohio, a corporation of
Delaware
Filed May 29, 1959, Ser. No. 816,754
5 Claims. (Cl. 264—43)

The present invention relates to an improved material and the process of making it. Although not limited to such applications, the material is particularly valuable in the missile industry for use in nose cone components. It may also be used in rocket nozzle liners—in fact, the material may be used to advantage wherever low thermal conductivity and/or heat resistance is required.

The advent of the missile age has resulted in an intense quest for new and improved materials capable of withstanding the severe environment conditions encountered during the flight regime. Re-entry conditions encountered during the terminal portion of the flight impose particularly severe requirements on nose cone materials since they are subjected at that time to very high heat fluxes.

To prevent thermal destruction of the nose cone, several special designs have been evolved. One involves fabrication of a heat sink capable of absorbing a large quantity of heat; impact occurs before nose cone temperatures become excessive. Other designs involve various forms of cooling, either internal or external, as by transpiration through the surface of the nose cone.

The most promising design evolved to date employs special ablation type materials. Ideally, such materials are characterized by low thermal conductivity, a high melting point constituent, and a large heat of vaporization. The present invention relates to this class of materials and satisfies the requirements efficiently.

As described later in this application, many different substances can be used in making this novel material. The preferred embodiment, however, comprises a porous ceramic skeleton impregnated with a synthetic resin. The skeleton may be molded from a slip containing an intimate mixture of powdered silica and comminuted silica fiber. After settling and drying, the molded skeleton is preferably sintered, following which it is impregnated with a plastic, such as phenolic resin.

The process and resulting product, briefly outlined above, are relatively low in cost. Conventional pottery molding techniques and processing equipment may be adapted to the novel process. Despite the low cost, the resulting material has low thermal conductivity and superior ablation characteristics, both of vital importance in nose cone applications.

It will be obvious from the foregoing that a broad object of the present invention is to provide an improved material and a process of making it.

A more specific object is to provide a process of making a novel material comprising a rigid skeleton in strengthening relationship with a hardened impregnant.

Still more specifically, it is an object of the invention to provide a ceramic skeleton for use as a reinforcement, particularly for strengthening synthetic resins commonly termed "plastics."

It is another object to provide a process of fabricating a reinforcing skeleton by molding a slip of comminuted silica fibers and silica powder, drying the molding after settling, and sintering it to bond the powder and fiber into a rigid mass.

A further object of the invention is to provide a skeleton made from (1) comminuted silica fiber; or (2) from silica powder; or (3) from an intimate mixture of comminuted silica fiber and silica powder.

The novel features that I consider characteristic of my invention are set forth in the appended claims; the invention itself, however, both as to its composition and method of fabrication, together with additional objects and advantages thereof, will best be understood from the following description of specific embodiments when read in conjunction with the accompanying drawing which shows a flow diagram indicating the process steps for making one version of the material.

The flow diagram, shown in the attached figure, depicts the preferred process for making one form of the novel material from quartz fiber and silica powder. In step 1 of the process, the quartz fiber is crushed or comminuted into very short lengths. The comminuted fiber is combined with silica powder and water slurry which has been thoroughly mixed on a ball mill in accordance with step 2. The fiber and powder are blended with water at 3 to form a homogeneous slip. Additives to impart certain properties to the finished product or to control subsequent processing may be included at this time, as indicated at 3a. The slip is then poured into a mold during step 4. The slip is allowed to settle during step 5 after which excess water is decanted at 6, following which there may be a further period of settling. The casting is then dried and trimmed at 7 and is heat treated by step 8, resulting in a siliceous porous skeleton which is then inspected and trimmed at 9. Following inspection of the skeleton, it may be impregnated by a synthetic resin at 10, followed by curing 11, machining 12, and final inspection of the finished material at 13.

A fiber that has been successfully used in the process is known as "microquartz," which is a leached form of fused silica fiber of approximately one micron diameter. (Although fiber diameter is not critical, an average value falling between 0.5 and 2.0 micron has been found highly satisfactory.) The silica powder preferably is amorphous silica of about 3–30 micron particle size, having a slip density of 1.80 gms./cc.

Crushing or comminuting of the fiber (step 1 of flow diagram) is important in producing a homogeneous slip. If the fiber is not crushed, it has a tendency to form lumps and does not disperse uniformly throughout the slip. Crushing may be accomplished by pressing the fiber in a hydraulic press at 1000 p.s.i. for a period of approximately 15 seconds. Crushing can also be accomplished in a muller, pulverizer, granulator, or similar apparatus capable of reducing the fiber to lengths shorter than ⅛". In practice it has been found satisfactory to use a fiber length between 0.5 micron minimum and ⅛" maximum.

Before use, the silica powder is placed on an agitator or ball mill to assure thorough mixing (step 2). The powder and crushed quartz are then blended (step 3) in a mechanical mixer, 1250 cc. of water being added to 500 gms. of quartz fiber and 200 cc. of silica powder. Such proportions produce a final skeleton of 46–49% density, 100% density being taken as 2.2 gms./cc.

After the ingredients are thoroughly mixed to form a homogeneous slip, the slip is poured into a mold (step 4) having the shape of the article to be formed. The molds may be simple in construction. Although it has been found convenient to make the molds from plastics, such as lucite, other common molding materials may be used. Obviously the mold should be properly designed to permit removal of the skeleton after it has hardened. Although nonporous plastic molds are preferred for molding material of the before-described composition, it is recognized that porous molds may be used.

After the slip has been poured into nonporous molds, it is allowed to settle (step 5) for a period of 16 to 18 hours, during which it is not disturbed. Any water accumulating above the casting is decanted (step 6) and the casting is desirably permitted to settle for an additional 24 hours.

Obviously, the settling time is not critical. If porous molds are used, this step may be shortened. Although a time saving can be effected in this way, mold removal is made more difficult since the cast material tends to interlock with the pores of the mold.

The casting is next dried in an oven (step 7). For cylindrical castings 12″ high with a wall thickness of 2″, drying may be accomplished in 16 hours in an electric oven maintained at 180° F. and 20–25% relative humidity. It is desirable to dry the casting as completely as possible, preferably until its moisture content is below 5% of the final weight.

Following the drying operation, the casting is strong enough to be handled and may be trimmed to remove any nonhomogenous portions that may tend to form at either extremity of the casting during the settling period.

After trimming or cropping, the casting is heat treated (step 8). Such heat treatment may take the form of sintering and may be accomplished by placing the casting in an oven which is heated from room temperature to 1400–2000° F. during a period of two hours. The oven is then held at 1400–2000° F. for an additional hour, after which the casting is furnace cooled to 700° F. At that temperature, the door of the oven may be opened to permit the casting to cool to 200° F. at which time it may be removed. The temperature employed for sintering depends upon the desired skeleton density and strength.

The casting after sintering is called a "skeleton" since it is used to reinforce the finished material. It will be noted that the skeleton consists of silica which has been found to impart important characteristics to ablation type materials. The skeleton is porous and has sufficient strength to permit handling and impregnation without distortion or disintegration. Since the sintering step res“ults in some fusion of particles and fibers, the final skeleton is bonded together by more than the mere mechanical interlocking of its constituents.

The skeleton may be impregnated with many different materials (step 10). A skeleton of the type specifically described may be impregnated with high temperature phenolic resin. As received from the manufacturer, such resin has a specific gravity of 1.13 and a viscosity of about 3500 centipoise/second at 75°±2° F. Before use as an impregnant, the plastic is diluted, preferably with methyl alcohol, to a specific gravity of 1.095±.002 and a viscosity not in excess of 600 centipoise/second.

Various methods of impregnating the skeleton have been used successfully. It may be impregnated within a vacuum or under pressure, or may be simply soaked in plastic under atmospheric pressure, which is perhaps the simplest way of accomplishing impregnation. Soaking for 24–26 hours in a resin bath maintained at 105±2° F. is satisfactory.

After the skeleton has been impregnated, it is drained for one-half hour and then cured (step 11) by being held at 150° F. for 16 hours, after which the temperature is raised to and maintained at 275° F. for three hours. At the end of the three-hour period, the temperature is again raised, this time to 350° F. which is maintained for a period of five hours. The material is then oven-cooled to room temperature.

The finished material (density of 1.25–1.35 gms./cc.), having substantially the shape as cast, may then be machined, using conventional machine tools and techniques, to any final shape that may be desired. After final inspection, the finished material is ready for use.

With an understanding of the process and resulting material, it is now possible to discuss certain general aspects of the invention. It is of cardinal importance to note that a material is disclosed that may be economically manufactured from low-cost, readily available materials. This is an important advantage over other ablation type materials which are more difficult and costly to manufacture.

Although for nose cone purposes it is desirable to make the skeleton from siliceous material and to impregnate it with a synthetic resin, such materials are not necessarily exhaustive of those that may be used. For instance, the skeleton could be made of other ceramics, such as alumina and magnesia, or from combinations, including metal refractory composites. The skeleton may be impregnated with epoxy and similar resins; instead of resins, salts such as ammonium chloride may be used as impregnants.

Directing attention to the skeleton, it preferably is made from a mixture of powder and fiber, although either one may be used separately in making the skeleton. It has been found that a mixture promotes mechanical strength, which is enhanced by sintering.

The type and form of ingredients used in making the skeleton also determine its final porosity. This is obviously important since the skeleton is eventually impregnated. By adding a fugitive binder, such as sawdust, to the skeleton during casting, and burning it out during sintering, porosity of the final skeleton may be varied over wide limits.

It is important to note that the skeleton is continuous, and homogeneous and, by its very nature, is isotropic. The same desirable characteristics are imparted to the finished material.

Although the preferred embodiment of the material is, in slip form, slightly acid, having a pH of 5–5½, the slip may be made either more acidic or basic. By adding hydrochloric acid to the slip, its pH value may be reduced to 1.4–4.5. To make the slip basic, ammonium hydroxide may be added until the pH value is raised to 8–11.5. Adjustment of pH value by additives is indicated at 3a in the flow diagram.

The advantage of acidic slip is that it deflocculates better, making it possible to keep the solid particles suspended in the slip with less water. Such slip also has better pouring characteristics. On the other hand, the more acid the slip is, the more it attacks metal parts of processing equipment. Such chemical attack tends to contaminate the finished material. Further, acidic slips tend to chemically attack plaster and cardboard molds.

Pronouncedly basic slips, on the other hand, deflocculate well, although not as well as acid slips. On the other hand, basic slip does not chemically attack equipment and promotes ease of mold removal.

Obviously, by adding suitable chemical reagents, the pH value of the slip can be adjusted as desired.

Instead of water, the silica may be blended with an ethyl orthosilicate solution or a methyl methacrylate solution. Such solutions serve as a binder, which may be fugitive, and give the casting green strength until sintering is accomplished.

It has been found by actual tests of the material specifically described that it has excellent ablation characteristics, and for this reason, is well adapted for use in rocket nozzle liners and nose cone components. In fact, it is superior in such application to conventional quartz fiber reinforced plastics.

The preferred form of material has a desirable balance of silica powder, silica fibers and plastics. Too much resin in such a material may cause the evolution of too much gas during the high heat flux period. The formation of such gases disturbs the molten silica layer at the surface of the material, detracting from its ablation characteristics. On the other hand, too much silica results in an uneven flow of molten surface material without sufficient vaporization. Bearing in mind that good ablation characteristics depend upon heat absorption through vaporization of materials, formation of a protective gas film at the surface of the material, high melting temperature of the material, and low thermal conductivity, it will be clear that a balance of these factors is necessary. This balance has been admirably attained in the preferred form of the material.

Since viscosity of silica increases with its purity, the ablation qualities of the material are improved by improving the purity of the silica. Increased viscosity promotes a more durable surface layer and results in a surface layer, which, even though molten, is not easily displaced by aerodynamic loading.

In view of the foregoing, it will be apparent that a new and improved material, and a process for making the material, has been evolved. Both the material and process are of great importance in missile development.

The various features and advantages of the invention are thought to be clear from the foregoing description. Obviously, many variations and modifications of the invention will occur to those skilled in the art, all of which may be achieved without departing from the spirit and scope of the invention.

I claim:

1. The process of making an ablation type material comprising the steps of intimately mixing silica in powder and comminuted fiber form, blending the mixture with water to form a silica slip, casting the slip into a desired shape, setting the slip and decanting excess water therefrom, drying the casting and sintering it at a temperature sufficient to form a rigid porous skeleton and fusing said silica fiber and silica powder at least in part one to another, and thereafter substantially completely impregnating the skeleton with a thermosetting synthetic resin having initially a fluid state to provide a finished material having a density in the range of about 1.35 grams per cubic centimeter.

2. The process of making an ablation type material comprising an impregnated siliceous skeleton which comprises the steps of intimately mixing silica in powder and comminuted fiber form, blending the mixture with water, casting it into a desired shape, removing the water from the casting, sintering the casting at a temperature sufficient to form a porous skeleton, and fusing said silica fiber and said silica powder at least in part one to another, and thereafter substantially completely impregnating the skeleton with a thermosetting resin having initially a fluid state to provide a finished material having a density in the range of about 1.35 grams per cubic centimeter.

3. The process of making an improved material comprising an impregnated siliceous skeleton which comprises the steps of blending silica powder with water to form a silica slip, casting the slip into a desired shape, removing the water from the casting and sintering it at a temperature sufficient to form a rigid porous skeleton and fusing said silica powder at least in part, and thereafter substantially completely impregnating the skeleton with a thermosetting resin having initially a fluid state to provide a finished material having a density in the range of about 1.35 grams per cubic centimeter.

4. The process of making an improved material comprising an impregnated siliceous skeleton which comprises the steps of blending comminuted quartz fiber and water to form a silica slip, casting the slip into a desired shape, removing the water from the casting and sintering it at a temperature sufficient to form a rigid porous skeleton and fusing said silica fiber at least in part, and thereafter substantially completely impregnating the skeleton with a thermosetting resin having initially a fluid state to provide a finished material having a density in the range of about 1.35 grams per cubic centimeter.

5. The process of making an ablation type material comprising the steps of forming a silica slip comprising discrete particles of silica and water, casting the slip into a desired shape, removing the moisture from the casting and heat treating it to form a porous skeleton and fusing said particles of silica at least in part one to another, and thereafter substantially completely impregnating the skeleton with a thermosetting resin having initially a fluid state to provide a finished material having a density in the range of about 1.35 grams per cubic centimeter.

References Cited by the Examiner

UNITED STATES PATENTS

| | | | |
|---|---|---|---|
| 701,708 | 6/1902 | Gibson et al. | 106—69 |
| 2,425,891 | 8/1947 | McMullen | 106—69 |
| 2,449,249 | 9/1948 | Pieslak et al. | 25—156 |
| 2,610,957 | 9/1952 | Steinam et al. | 260—38 |
| 2,698,251 | 12/1954 | Shea et al. | 260—38 |
| 2,714,556 | 8/1955 | Goetzel | 29—182.1 XR |
| 2,835,107 | 5/1958 | Ward | 60—35.6 |
| 2,949,375 | 8/1960 | Reuter | 106—69 XR |
| 2,991,267 | 7/1961 | Bean | 260—38 |
| 2,992,124 | 7/1961 | Campbell | 260—38 XR |

FOREIGN PATENTS

| | | |
|---|---|---|
| 757,890 | 9/1956 | Great Britain. |

OTHER REFERENCES

Encyclopedia of Chemical Technology, Kirk & Othmer, 1953, vol. 11, pp. 597–600 and 623–626, Interscience Encyclopedia Inc., New York.

Jet Propulsion, Miller et al.: November 1956, pp. 969–972.

ROBERT F. WHITE, *Primary Examiner.*

WILLIAM WILES, LEON D. ROSDOL, CARL D. QUARFORTH, *Examiners.*

W. A. KEMMEL, A. D. AKERS, W. T. HOUGH, L. D. RUTLEDGE, J. A FINLAYSON, *Assistant Examiners.*